United States Patent
Herrmann et al.

(10) Patent No.: US 6,313,795 B1
(45) Date of Patent: *Nov. 6, 2001

(54) DIRECTION-FINDING METHOD FOR DETERMINING THE INCIDENT DIRECTION OF A HIGH-FREQUENCY ELECTROMAGNETIC SIGNAL

(75) Inventors: Franz Herrmann, Opfingen; Manfred Schuster, Illertissen, both of (DE)

(73) Assignee: Daimler-Benz Aerospace AG (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/170,201

(22) Filed: Oct. 13, 1998

(30) Foreign Application Priority Data

Oct. 10, 1997 (DE) .............................. 197 44 692

(51) Int. Cl.⁷ ...................................................... G01S 5/04
(52) U.S. Cl. ................................ 342/442; 342/156
(58) Field of Search .................. 342/442, 433, 342/56, 156

(56) References Cited

U.S. PATENT DOCUMENTS

| | | | |
|---|---|---|---|
| 4,626,859 | 12/1986 | Stansfield | 342/442 |
| 4,876,549 | 10/1989 | Masheff | 342/417 |
| 5,497,161 | 3/1996 | Tsui | 342/147 |
| 5,559,518 * | 9/1996 | DiDomizio | 342/174 |
| 5,568,154 | 10/1996 | Cohen | 342/443 |

FOREIGN PATENT DOCUMENTS

4421571 A1   1/1996  (DE) .

* cited by examiner

*Primary Examiner*—Theodore M. Blum
(74) *Attorney, Agent, or Firm*—Venable; George H. Spencer; Robert Kinberg

(57) ABSTRACT

A direction-finding method for determining an incident angle of a high-frequency electromagnetic signal in a system including at least two receiving antennas spaced apart by a known distance. the antenna output signals of the at least two receiving antennas are converted, together (in accordance with a multiplexing procedure) or individually, into the frequency domain through a Fourier transformation, followed by a conversion into an IF range and an A/D conversion. In this range, the phase difference between the output signals is determined and the signal frequency of the incident wave is determined through a phase-sequence analysis. The incident angle of the incident wave is determined from the phase difference and the signal frequency.

7 Claims, 2 Drawing Sheets

DIRECTION-FINDING METHOD FOR DETERMINING THE INCIDENT DIRECTION OF A HIGH-FREQUENCY ELECTROMAGNETIC SIGNAL

CROSS-REFERENCE TO RELATED APPLICATION

Priority is claimed with respect to German application No. 197 44 692.2 filed in Germany on Oct. 10, 1997, the disclosure of which is incorporated herein by reference.

BACKGROUND OF THE INVENTION

The invention is based on a direction-finding method for determining an incident direction of a high-frequency electromagnetic signal with respect to a predeterminable primary direction of an antenna arrangement including at least two receiving antennas spaced apart a known distance for receiving the incident signal, wherein a phase difference is determined between the output signals of the receiving antennas and the incident direction of the signal is determined from the phase difference.

A method of this type is known per se, particularly in so-called interferometer direction finders. These are based on the use of at least two (receiving) antennas specified for a predeterminable frequency range, such as the high-frequency (HF) range. The antennas possess a predeterminable directional pattern, for example a so-called forward characteristic. That is, each antenna has a maximum receiving range of 180° in, for example, the azimuth plane (parallel to the earth's surface) It is useful to orient the primary receiving directions of all antennas essentially parallel to one another, resulting in a common primary receiving direction. If a mono-frequency HF signal, for example, is incident at such an antenna arrangement from a direction other than the primary receiving direction, differences in transit times occur at the individual antennas, from which associated phase differences can be determined. The searched receiving direction (incident direction) of the HF signal (HF wave) can basically be determined from this phase difference between the received signals of two antennas.

SUMMARY OF THE INVENTION

It is an object of the invention to improve on a method of the generic type first mentioned above to permit a high measuring precision with a high angular resolution and a high reaction speed.

The above and other objects are accomplished according to the invention by a direction-finding method for determining an incident angle ($\theta$) of a high-frequency electromagnetic signal in a system including at least two receiving antennas spaced apart by a known distance (D) for receiving the incident signal, the method including steps of:

(a) converting output signal of each antenna into an intermediate-frequency signal having a predeterminable intermediate frequency;

(b) converting the intermediate-frequency signals into a corresponding digital signals;

(c) converting the digital signals into the frequency domain through a Fourier transformation;

(d) measuring a phase-difference in the frequency domain between the frequency domains signals associated with the antennas yielding a phase difference ($\Delta\phi$);

(e) performing a phase-sequence analysis in the frequency domain for determining phase differences for temporally-successive Fourier intervals continuously within a predeterminable measuring period;

(f) determining from the phase differences of step (e) an estimated value for signal frequency (f) within the discrete Fourier spectrum; and (g) determining an incident angle (e) from the phase difference ($\Delta\phi$) and the signal frequency (f) according to the formula:

$$\theta = \arcsin[c_0 \cdot \Delta\phi / (2\pi \cdot f \cdot D)]$$

where $c_0$ = speed of light.

A first advantage of the invention is that it is not necessary to determine the frequency of the incident signal (wave). Thus, a so-called broadband receiver advantageously having a predeterminable, short transient period can be used. This is because a long transient period causes a disadvantageous reduction in the reaction time of the measurement method.

A second advantage is that the method of the invention is largely independent of intentional and/or unintentional disturbances and environmental conditions, for example a further incident signal that is virtually identical to the signal to be evaluated.

A third advantage is that it is possible to perform a simultaneous measurement of a plurality of identical or different signals having different signal frequencies.

A fourth advantage is that a high aging stability can be attained for an arrangement operated in accordance with the invention. The measurement results can be advantageously reproduced, because so-called drift is avoided.

Further advantages ensue from the following detailed description considered in conjuction with the accompanying drawings.

BRIEF DESCRIPTION OF THE DRAWINGS

The invention is described in detail below by way of embodiments illustrated schematically in the drawings, wherein.

DETAILED DESCRIPTION OF THE INVENTION

The direction-finding method described below is suited for precise measurement of the incident direction of virtually any high-frequency (HP) signals. A priori knowledge or a prior measurement of the signal frequency is not required. The method is based on an expanded FFT analysis, and can be used for both continuous and pulsed HF signals. If predeterminable conditions are met, even a temporal superposing of signals is permissible.

The underlying concept of the method is that, following a selection of the frequency of the measurement signal in separate measurement channels with the use of digital filtering without temporal gaps (in this special case: the use of a complex broadband FFT (Fast Fourier Transformation)), the associated phase differences are evaluated and the phase angle sequences of successive FFT cycles are analyzed. Thus, a simultaneous measurement of a plurality of identical or different signals having different frequencies is possible.

Figure 1:
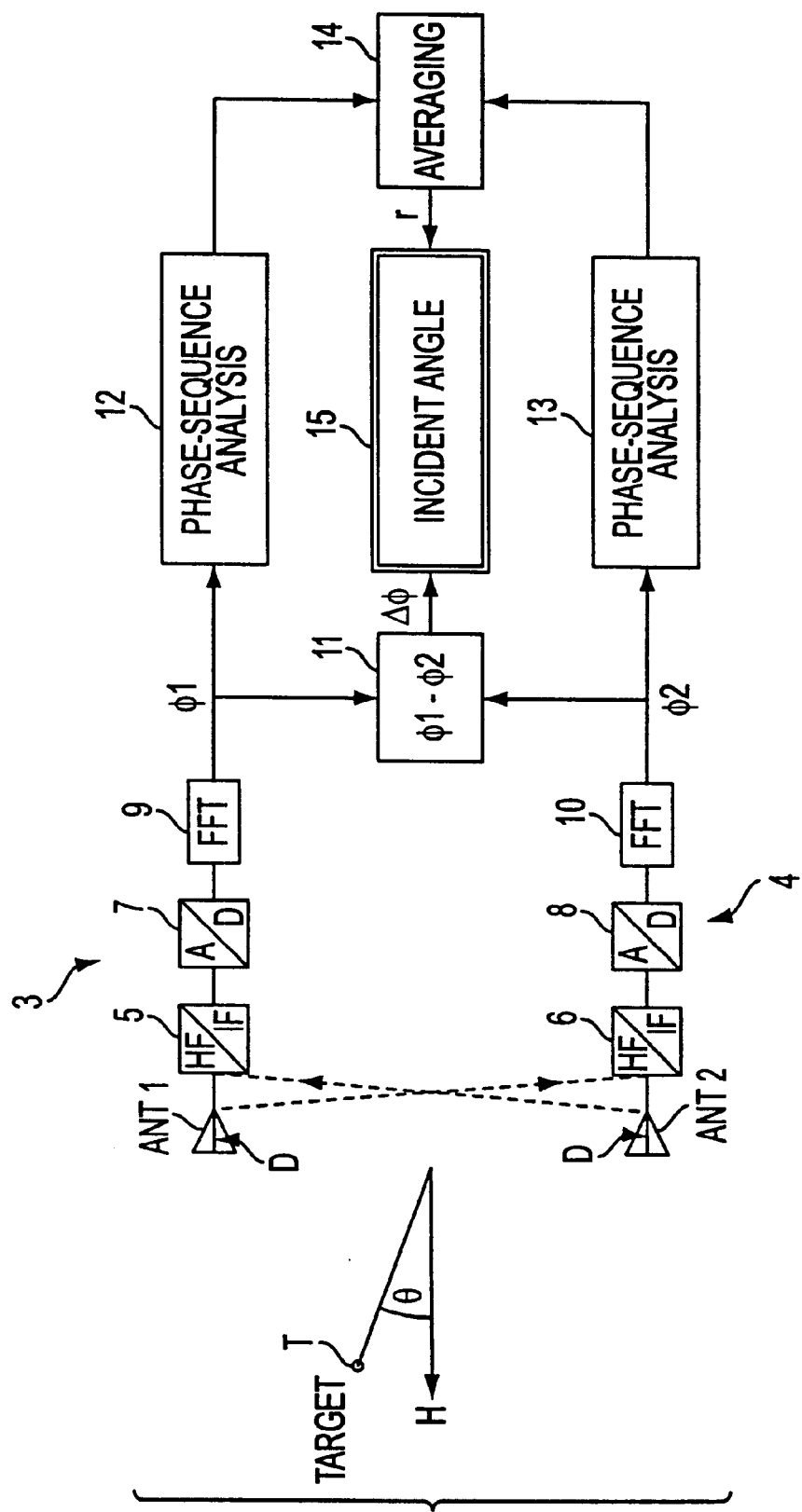
FIG. 1 shows a block diagram of a first embodiment having two antenna channels which can be used for implementing the method of the invention.

FIG. 1 shows a target T, for example a high-frequency or extremely-high-frequency transmitter, that transmits an HF signal. The associated wave (incident signal) has an incident angle θ (signal incident direction) to be measured with respect to a predeterminable primary direction H of an antenna arrangement including at least two essentially identical, generally parallel-oriented antennas 1 and 2 which are used as high-frequency signal receivers. Antennas 1 and 2 are embodied as broadband antennas, for example for the radar frequency range, and are oriented such that their primary receiving direction coincides with the primary direction H. The method can even be used if a large angle difference, for example 45 degrees, exists between the antenna axes (primary directions of the receiving characteristic). In other words, no mechanical adjustment of the antennas 1 and 2 that would be cost-prohibitive and susceptible to interference is necessary. An associated antenna channel 3, 4 is disposed downstream of each antenna 1, 2. Each antenna channel includes an antenna preamplifier (not shown separately from the antennas) that is adapted to the signals to be received. Downstream of the respective antenna/preamplifier 1, 2 is an HF/IF mixer 5, 6 for a predeterminable intermediate-frequency range (IF range). The output signal of the mixer is supplied to an analog/digital (A/D) converter 7, 8 preceding an FFT arrangement 9, 10, in which a conversion is effected from the time domain into the frequency domain. At the output of the FFT arrangements 9, 10, two signals having generally different phases $\phi_1$, $\phi_2$ result for each spectral component (in each of the simultaneous HF signals) that can be distinguished in the frequency. Now a phase-difference measurement $\phi_1 - \phi_2$ is performed in a phase differencer 11, yielding a phase-difference signal according to the formula $$\Delta\phi = \phi_1 - \phi_2$$

with $\Delta\phi$ indicating the phase difference between the two output signals of the FFT arrangements.

With a known or measurable antenna base distance D, the searched incident angle θ can be determined from the (initially unknown) signal frequency f and the phase difference $\Delta\phi$ between the two antenna measurement channels according to the formula:

$$\theta = \arcsin[c_0 \cdot \Delta\phi / (2\pi \cdot f \cdot D)] \quad (1)$$

where
  $c_0$ = speed of light.

In the present method, the phase difference $\Delta\phi$ results directly from the (complex) FFT results of the two analysis channels. As an alternative, with the prerequisite of a sufficiently-long, predeterminable signal period, it is possible to determine the phase difference $\Delta\phi$ over several FFT intervals by forming an average value. In this way, statistical measuring errors can advantageously be reduced to a non-interfering, negligible value. It is possible to reduce the statistical measuring errors further with an alternating, crossover switching of the antenna channels over time. In the process, for example, the output signals of the antennas 1, 2 are first evaluated in the manner illustrated in FIG. 1. After a predeterminable time clock, a switch is made such that the antennas 1, 2 are connected to the downstream evaluation channels corresponding to the (crossed) connections shown as dashed lines in FIG. 1.

The signal frequency f also required for determining the incident angle θ according to Eq. (1) is advantageously likewise obtained from the FFT results (output signals of the FFT arrangements) by performing a phase-sequence analysis in units 12 and 13 downstream of the respective FFT arrangements 9 and 10.. To increase the measuring precision in comparison to a simple FFT analysis (where the frequency-measuring precision is determined solely by the FFT line spacing in the amplitude spectrum), in this method a frequency-measurement method is used that is based on a special evaluation of FFT phase sequences that result during a complex filtering, preferably a broadband FFT. Here, the so-called result vectors resulting during a complex broadband FFT are determined continuously, separately for each (antenna) evaluation channel in the complex frequency domain, and over a predeterminable measurement period, with their phase angles being determined in the complex frequency domain. An average (weighted) phase angle is determined from a predeterminable sequence of temporally-successive phase angles, and from this an estimated value is determined for the signal-frequency position within the discrete FFT spectrum. The frequency-measuring precision attained here is dependent, on the one hand, on the selected measurement period and, on the other hand, on the existing signal-to-noise ratio in the measurement channel (antenna channel). The measuring method used for precise frequency measurement in direction finding is described in detail in German patent application DE 197 44 691.4 and its concurrently filed U.S.counterpart application Ser. No. 09/170,200, the disclosure of which is incorporated herein by reference.

The frequency estimated values formed separately in phase sequence analysis units 12 and 13 for the two antenna measurement channels can, if needed, be combined to form a common frequency estimated value through arithmetic averaging in an averaging unit 14.

The signal frequency f determined in this way (according to the optional averaging) is subsequently supplied to an evaluation arrangement 15 for determining the incident angle θ, where an evaluation takes place according to Eq. (1).

It is possible to simplify the described method if the signal frequency f is determined in a phase-sequence analysis in only one of the antenna measurement channels 3, 4.

With the prerequisite of a sufficient, predeterminable spectral selection through the FFT analysis (influencing factors, including the signal-to-noise ratio and frequency distance), the described measurement method for determining the incident angle can advantageously be used for finding the direction of a plurality of simultaneously-present signals, which may have different incident angles (simultaneous direction finding).

Figure 2:
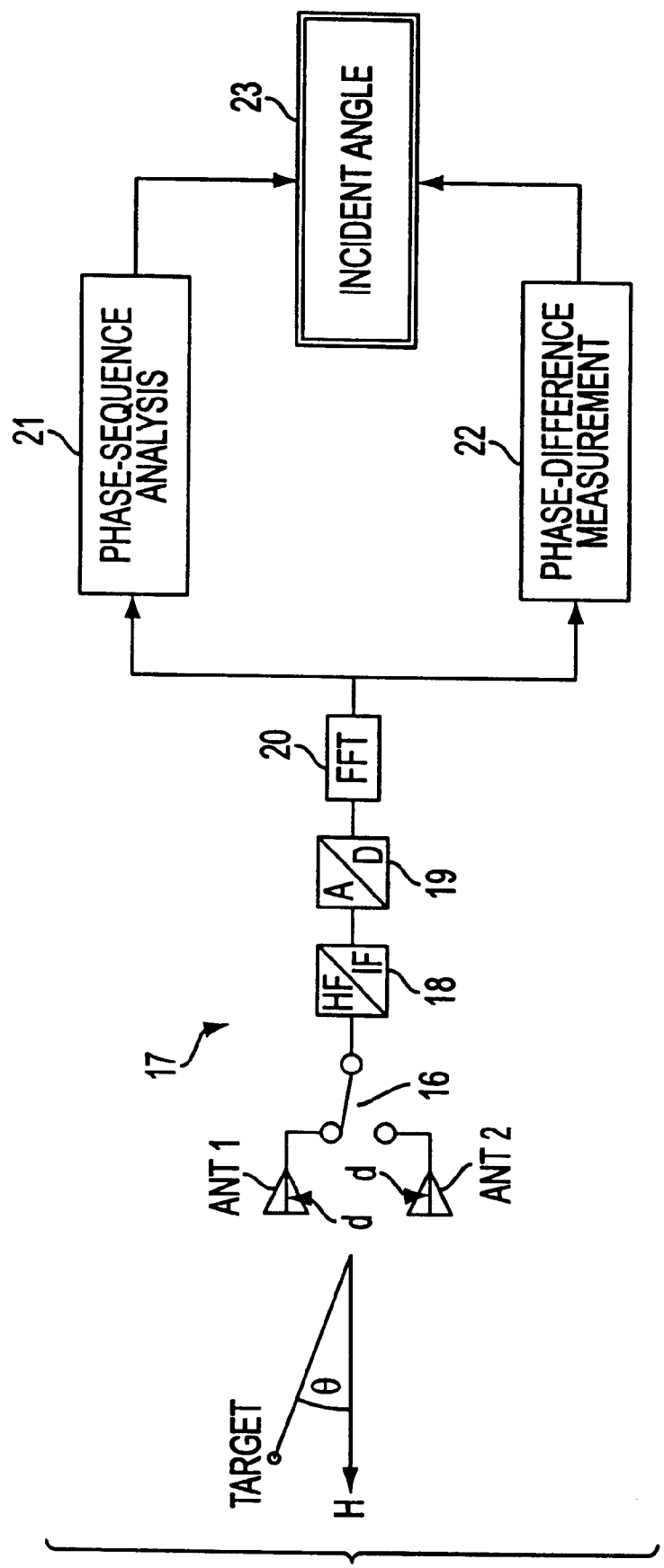
FIG. 2 shows a block diagram of a second embodiment having an antenna change-over switch and only one downstream antenna channel which can be used for implementing the method of the invention.

FIG. 2 shows an arrangement for reducing the circuitry outlay for executing the method. This arrangement is distinguished from the one according to FIG. 1 in that the output signals of the antennas 1 and 2 are preferably supplied to an antenna change-over switch 16 (multiplexer), preferably following preamplification. The output signal of the change-over switch is processed in a single analysis channel (evaluation channel) 17 which includes an HF/IF mixer 18 disposed downstream of change-over switch 16, followed by an A/D converter 19 and an FFT transformer 20 which perform the same functions as described in connection with FIG. 1. After each FFT interval, the antenna change-over switch 16 switches alternatingly between the output signals of the individual antennas. The output of FFT transformer 20 branches of to a phase differencer analysis unit 21 for determining the frequency f as described above and to a phase differencer unit 22 for measuring the phase difference between the signals received on antennas 1 and 2. The frequency f and phase difference $\Delta\phi$ are fed to evaluation unit 23 for determining the incident angle according to Equation 1. In this way, measuring imprecisions that can be attributed to so-called synchronism problems can be reduced to a negligible value. The described, modified direction-finding method, however, requires a predeterminable constancy of both the signal frequency and the angular position over the predeterminable measurement period.

The following values, for example, are attainable with the method:

With a sampling frequency of, for example, 1 GHz, and with a minimal signal-to-noise ratio of 0 dB, for the incident wave, a wave-measuring precision of about 0.5 mrad (rms) with an incident angle $\theta$ within a (an angular) single-value range determined by the selected antenna spacing can be attained. The antenna distance is $10\lambda$, with $\lambda$ indicating the wavelength of the incident wave. A pulse period of 1 $\mu s$ is established, and a 64-point FFT is used, that is, one FFT interval includes 64 sampling values. The frequency-measuring precision is less than or equal to 100 kHz, and corresponds to the precision disclosed in the aforementioned German patent application DE 197 44 691.4 filed in Germany on Oct. 10, 1997 and its U.S.counterpart application Ser. No. 09/170,200 concurrently filed on Oct. 10, 1998. In this case, the measurement period can be selected to be greater than or equal to $1/T_{FFT}$, with $T_{FFT}$ indicating the time period of an FFT interval. Short measurement periods of this type are sufficient for performing simultaneous direction finding. So-called drift is determined solely through a possibly-present temporal drift of the sampling clock.

The invention is not limited to the described examples, but can be applied to a wide range of electrical engineering and/or measuring techniques. This is because it is evident that the method is suitable for incident electromagnetic waves of virtually any frequency. It is then only necessary to adapt the receiving antennas and the components and/or assemblies used to execute the method, particularly the HF/IF mixer, the A/D converter and the FFT transformer, to the frequency range used.

The invention has been described in detail with respect to preferred embodiments, and it will now be apparent from the foregoing to those skilled in the art, the changes and modifications may be made without departing from the invention in its broader aspects, and the invention, therefore, as defined in the appended claims, is intended to cover all such changes and modifications as to fall within the true spirit of the invention.

What is claimed is:

1. A direction-finding method for determining an incident direction of a high-frequency electromagnetic signal with respect to a predeterminable primary direction of an antenna arrangement including at least two receiving antennas spaced apart by a known distance (D) for receiving the incident signal, the method including steps of:
   (a) converting output signal of each antenna into an intermediate-frequency signal having a predeterminable intermediate frequency;
   (b) converting the intermediate-frequency signals into a corresponding digital signals;
   (c) converting the digital signals into the frequency domain through a Fourier transformation;
   (d) measuring a phase-difference in the frequency domain between the frequency domain signals associated with the antennas yielding a phase difference ($\Delta\phi$);
   (e) performing a phase-sequence analysis in the frequency domain for determining phase differences for temporally-successive Fourier intervals continuously within a predeterminable measuring period;
   (f) determining from the phase differences of step (e) an estimated value for signal frequency (f) within the discrete Fourier spectrum; and
   (g) determining an incident angle (e) from the phase difference ($\Delta\phi$) and the signal frequency (f) according to the formula:

$$\theta = \arcsin[c_0 \cdot \Delta\phi/(2\pi \cdot f \cdot D)] \quad (1)$$

where $c_0$=speed of light.

2. The direction-finding method as defined in claim 1, further including:
   supplying the output signals of the antennas to an analysis channel comprising at least an antenna change-over switch for switching the output signals of the antennas, with the antenna change-over switch being switched between the antennas following each Fourier interval, using as a measure the temporal length of the Fourier intervals; and wherein;
   step (a) includes switching the antenna signals into the predeterminable intermediate-frequency range with a mixer disposed downstream of the antenna change-over switch;
   Step (b) includes converting the intermediate-frequency signals into the corresponding digital signals with the use of an analog/digital converter disposed downstream of the mixer; and
   step (c) includes with the use of a Fourier transformer disposed downstream of the analog/digital converter.

3. The direction-finding method as defined in claim 1, including coupling each antenna to an associated analysis channel, respectively comprising at least a mixer for converting the antenna output signal into the predeterminable intermediate-frequency range according to step (a), an analog/digital converter disposed downstream of the mixer for converting the intermediate-frequency signals into the corresponding digital signals according to step (b), and a Fourier transformer disposed downstream of the analog/ digital converter for converting the digital signals into the frequency domain according to step (c); and wherein
   the measuring of step (d) comprises measuring the phase difference ($\Delta\phi$) between the output signals of the Fourier transformers associated with each antenna.

4. The direction-finding method as defined in claim 3, wherein step (e) includes performing the phase-sequence analysis in only one analysis channel after the Fourier transformation for determining the signal frequency (f) that is used to determine the incident angle.

5. The direction-finding method as defined in claim 3, wherein step (e) includes performing the phase-sequence analysis for determining a signal frequency in each analysis channel after the Fourier transformation; and further including averaging the signal frequencies determined in each analysis channel in a predeterminable fashion, resulting in an average signal frequency (f) which is used to determine the incident angle.

6. The direction-finding method as defined in claim 1, wherein step (c) includes using a Fast-Fourier transformation at least when incident signals are in a high-frequency or extremely-high-frequency range.

7. The direction-finding method as defined in claim 1, utilized for simultaneous direction finding in which incident directions of at least two different incident waves are determined essentially simultaneously.

* * * * *